(No Model.)
F. A. HOFFMAN, Dec'd.
C. E. HOFFMAN, Administratrix.
FUMIGATOR.
No. 483,484.   Patented Sept. 27, 1892.
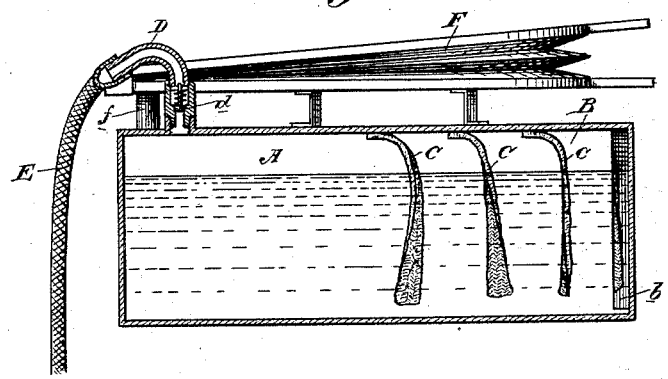
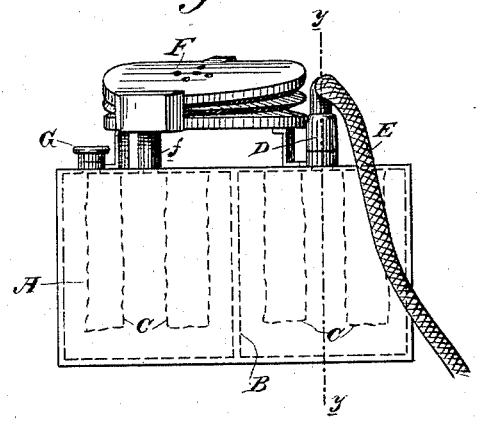
Witnesses,
Inventor,
Ferdinand A. Hoffman
By Dewey & Co.
Attys

UNITED STATES PATENT OFFICE.

FERDINAND A. HOFFMAN, OF BYRON, CALIFORNIA; CLARA E. HOFFMAN ADMINISTRATRIX OF SAID FERDINAND A. HOFFMAN, DECEASED.

FUMIGATOR.

SPECIFICATION forming part of Letters Patent No. 483,484, dated September 27, 1892.

Application filed May 4, 1892. Serial No. 431,822. (No model.)

*To all whom it may concern:*

Be it known that I, FERDINAND A. HOFFMAN, a citizen of the United States, residing at Byron, Contra Costa county, State of California, have invented an Improvement in Animal-Exterminators; and I hereby declare the following to be a full, clear, and exact description of the same.

My invention relates to that class of devices for exterminating small burrowing-animals like gophers and ground-squirrels, in which means are provided for generating and forcing noxious fumes and vapors into the holes.

My invention consists in connection with the bellows and outlet of the novel generator hereinafter fully described, and specifically pointed out in the claims.

The object of my invention is to provide an exterminator of this class in which the fumes or vapors shall be generated freely and shall mingle with and load the air forced through them, whereby they are carried down into the holes or burrows of the animals.

Referring to the accompanying drawings for a more complete explanation of my invention, Figure 1 is a vertical longitudinal section on the line $y\ y$ of Fig. 2. Fig. 2 is an end view of my exterminator, the partition B, dividing the generator into separate channels, being shown in dotted lines.

A is a hollow casing which forms the generator. This is provided with an interior partition B, dividing the casing into separate channels. The partition is open at one end, as shown at $b$, thus making a communication between the separate channels.

Secured to the under side of the top of the casing and hanging therefrom are the strips C, of absorbent material, such as lamp-wick. These extend down to the bottom of the casing and are located in both channels near their communicating ends, or they may be located throughout the length of said channels.

In the top of one channel of the casing, at its end removed from its communication with the other channel, is an outlet-pipe D, to which is joined a hose or other conveyer-pipe E. In the outlet-pipe D is an outwardly-opening spring-controlled valve $d$.

Secured upon top of casing A is the bellows F, the discharge-pipe $f$ of which enters that end of the other channel of the casing removed from its communication with the adjacent channel.

G is a plug-controlled inlet by which the liquid is supplied to the casing A.

The use and operation of my exterminator are as follows: Any volatile liquid, the vapor of which is noxious to the animals to be destroyed, is filled into casing A through inlet G. The liquid I prefer and intend to use in this connection is bisulphide of carbon. This is a very volatile liquid, the vapor of which readily rises and mixes with air. It is also deadly in its action upon the animals when confined in their burrows. It has heretofore been used by pouring it in the hole or by rolling down the hole a ball of absorbent material saturated with it. When casing A is supplied with the liquid, the end of conveyer-pipe E is placed in the mouth of the burrow and a little dirt is tamped about it to close it in. Then the bellows are operated and air is thereby forced down into the first channel of the casing. It passes along to the back end of this channel, picking up the vapor of the carbon bisulphide and enters the second channel through the communicating aperture. In the second channel it passes forwardly, becoming fully saturated with the vapor, and it finally is forced through the valved outlet into the conveyer-pipe, by which it is discharged into the burrow. Thus by reason of the connected channels the air travels through an extended course to permit it to be thoroughly saturated. The absorbent pendent strips being themselves constantly saturated with the liquid present extended surfaces to the air which readily takes up the vapor from them. The object of the valve in the outlet is to prevent the suction of the vapor back into the bellows, and also to prevent the escape of gas through the conveyer-pipe when the device is not in use. Connecting-holes with the burrow being operated upon can be detected by the odor of escaping vapor and these can be stopped up. Thus the animals will be confined with the vapor and will be destroyed.

Having thus described my invention, what I claim as new, and desire to secure by Letters Patent, is—

1. In an animal-exterminator, the combination of the casing having a vertical partition dividing the casing into separate channels, said partition terminating short of one end of the casing to form a communicating passage between the channels, an outlet-pipe leading from the closed end of one channel, and an air-blast apparatus connected with the adjacent end of the other channel, whereby an air-current is forced through both channels, substantially as herein described.

2. An animal-exterminator consisting of a casing having the internal partition open at one end and dividing said casing into separate communicating channels, the absorbent strips in said channels, an outlet-pipe from the closed end of one channel, and a bellows having a connection with the adjacent end of the other channel, substantially as herein described.

3. An animal-exterminator consisting of the casing having the internal partition open at one end and dividing said casing into separate communicating channels, the absorbent strips in said channels, an outlet-pipe from the closed end of one channel, the valve in said pipe, the conveyer-pipe attached to said outlet-pipe, and a bellows having a connection with the adjacent end of the other channel, substantially as herein described.

In witness whereof I have hereunto set my hand.

FERDINAND A. HOFFMAN.

Witnesses:
I. C. HALL,
THOS. CARLTON.